United States Patent [19]

Crétien

[11] 3,743,886
[45] July 3, 1973

[54] VEHICLE LIGHTING
[76] Inventor: Jean Paul Crétien, 3, rue Sophie, Saint Leu La Foret, France
[22] Filed: Apr. 21, 1971
[21] Appl. No.: 135,832

[30] Foreign Application Priority Data
   Apr. 5, 1970  France .............................. 7011903
   Apr. 22, 1970 France .............................. 7014609

[52] U.S. Cl. .................... 315/83, 315/158, 315/159
[51] Int. Cl. ...... B60q 1/08, B60q 1/14, H05b 37/02
[58] Field of Search ........................ 315/82, 83, 158, 315/159, 149, 156

[56]             References Cited
            UNITED STATES PATENTS
1,694,511  12/1928  Von Der Lippe-Lipski..... 315/158 X
1,917,532  7/1933   Loewenstein .................... 315/158 X
2,820,925  1/1958   Schmidt, Jr. .......................... 315/83
1,686,859  10/1928  Huntington .......................... 315/83
2,319,494  5/1943   Dusdieker ....................... 315/159 X
3,316,442  4/1967   Zuse ............................... 315/159 X
3,371,241  2/1968   Amacher ............................ 315/77
3,486,066  12/1969  Jones et al. ...................... 315/83 X FOREIGN PATENTS OR APPLICATIONS
190,596  12/1922   Great Britain ...................... 315/83

Primary Examiner—Rudolph V. Rolinec
Assistant Examiner—Marvin Nussbaum
Attorney—Plumley & Tyner

[57]            ABSTRACT

A system for automatically reducing the intensity of light emitted from the head lamps of approaching vehicles. The intensity of light is successively reduced as the vehicles approach. Control means are provided to prevent an increase in light intensity while the vehicles are approaching.

4 Claims, 17 Drawing Figures

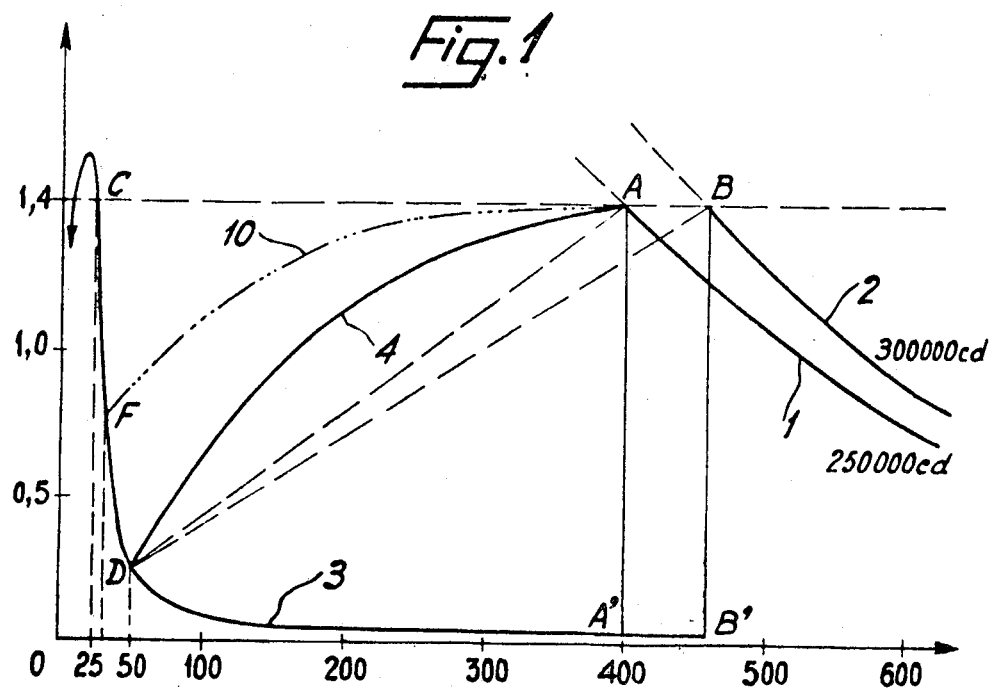
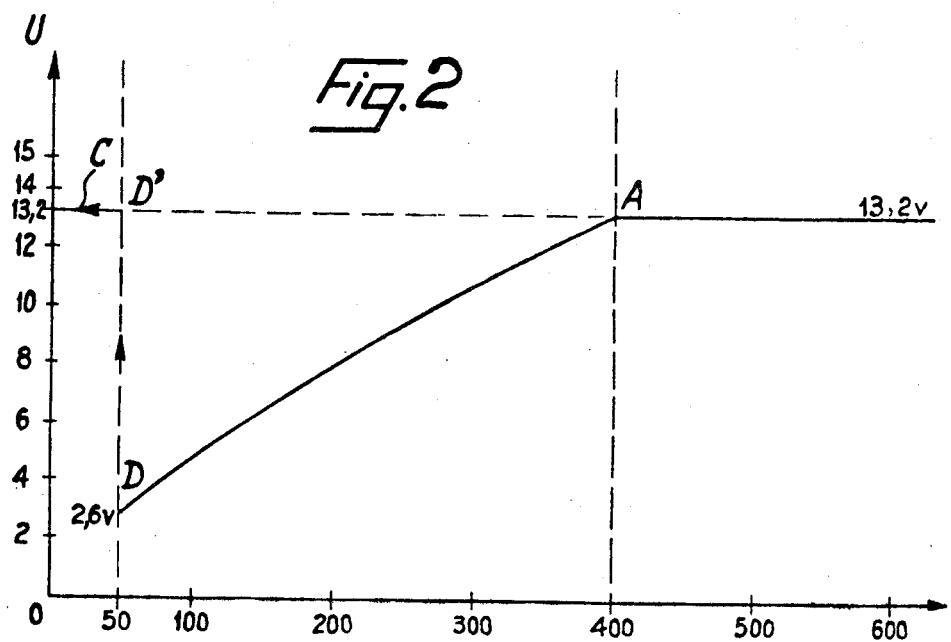

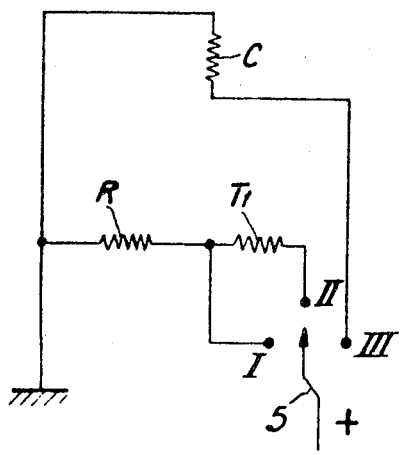
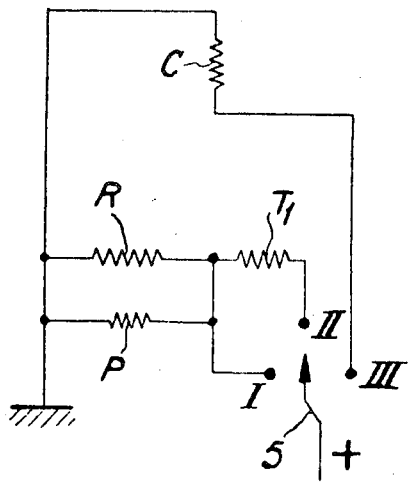
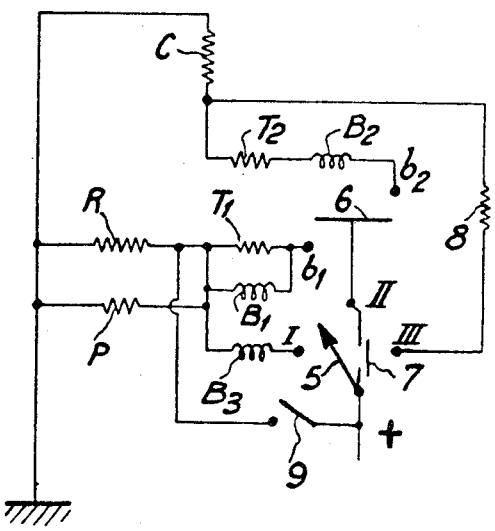
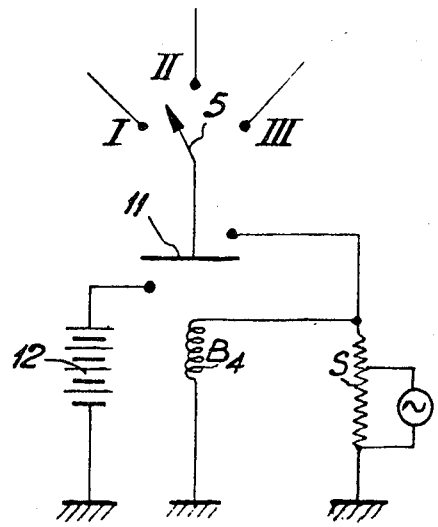

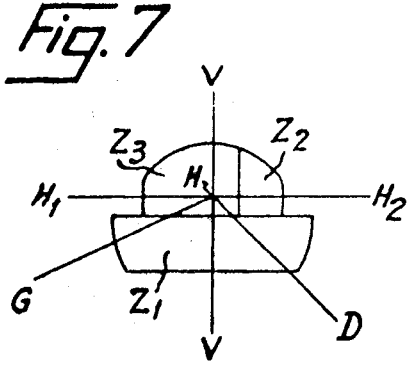
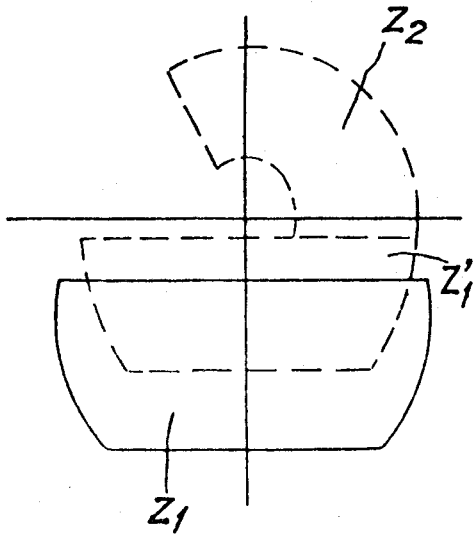
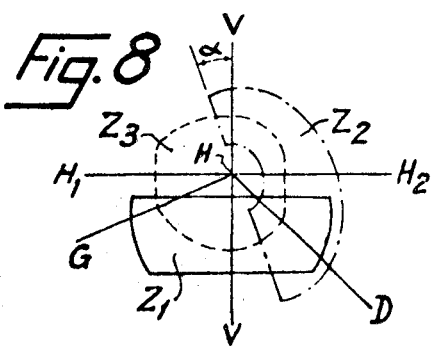
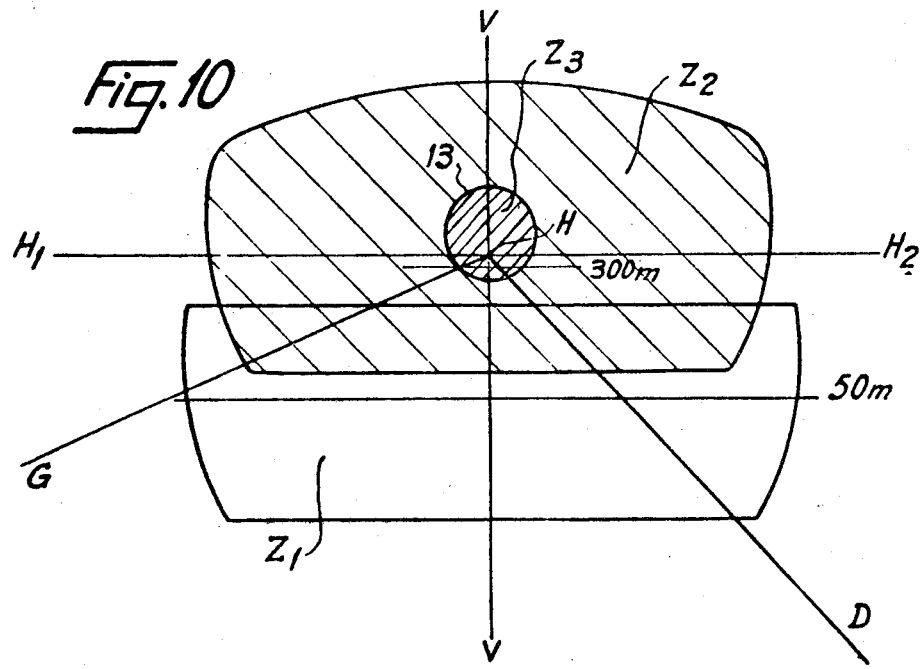
INVENTOR: Jean-Paul Cretien

INVENTORS: Jean-Paul Cretien
ATTORNEYS:

VEHICLE LIGHTING

The present invention concerns vehicle lighting.

It is known that the dazzling effect to which the drivers of oncoming automobile vehicles are subjected increases in intensity, for a given illumination, as the vehicles approach each other. According to the intensity of the headlights, the allowable glare limit is attained, generally, when the vehicles are no longer at a distance of no more than 400 to 450 meters from each other. At this moment, the headlights are replaced by more reduced lighting that is termed dimmed lighting. Now, this oncoming illumination is adjusted, generally, in such a manner that the fore-mentioned glare limit not be attained again until the vehicles are very close to each other, for example at a distance of approximately 25 meters. The result of this is that, as long as the vehicles have not reached this degree of proximity, that is to say over a distance of the order of 400 meters, dazzle is, of course, highly reduced but the lighting is most insufficient and could be the cause of serious accidents (pedestrians or cycles badly illuminated, knocked down etc.).

The essential purpose of this invention is to create a perfected lighting installation for vehicles that makes it possible to remedy this disadvantage to the greatest possible extent.

The purpose of the present invention is a new industrial product consisting of a vehicle lighting installation with a headlight system and a dimmed lighting system characterized by the fact that it includes a transient lighting system that can be placed into service as soon as the headlights could dazzle the occupants of an oncoming vehicle until the distance between the vehicle under consideration and the oncoming vehicle has attained a lower value at which only the dimmed lighting can be used.

This improvement can be applied in various manners.

Thus, for example, it is possible to obtain the transient lighting either by progressively reducing the intensity of the normal headlight beam, or by temporarily increasing the intensity of the dimmed light beam to progressively return it to its normal value.

It is also possible to equip the vehicle with an auxiliary lighting system making it possible to obtain the transient lighting, with this auxiliary capable, if necessary, of supplying lighting with progressively reducing intensity as the oncoming vehicles approach each other. Where the various methods of application under consideration are concerned several have been retained in accordance with the invention.

In a first alternative, the purpose of the present invention is a lighting installation, with the transient lighting system being controlled by the user with a three-position selector, one of the first positions corresponding to headlights, the second position corresponding to transient lighting and the third position corresponding to dimmed lighting, characterized by the fact that the power supply from the second position of the forementioned selector results in the electrical power supply of the headlight filaments through a series connected variable resistor, the variation in the said resistor being controlled by a time-delay system by actuation of the three-position selector.

In a first application mode of this first alternative, the variable resistor variation control places in the series with the headlightfilament is obtained mechanically or else from the movement of the moving three-position selector arm, or else from the moving armature of an electro-magnetic relay controlled by the positioning of the moving arm of the selector on the second position of the said selector. In a second application mode of the first alternative, the time-delay system of the variable resistor variation is obtained electrically; in this latter case, provision can be made for automatic power supply of the dimmed lights when the power supply voltage of the headlight filament has dropped beneath a predetermined level. In a third application mode of the first alternative, the delayed resistor variation can be obtained mechanically by a component that is directly or indirectly subjected to heating due to passage of current on placing of the three-position selector moving arm on the second position of the said selector.

In a second alternative, the purpose of the present invention is a new industrial product consisting of a vehicle lighting installation, characterized by the fact that the transient lighting system consists of means making it possible to simultaneously and continuously decrease the power supply voltage of the headlight filament and increase the power supply voltage of the dimmed light filaments.

In a preferred application mode of this second alternative, the power supply of the headlight filament and that of the dimmed light filament is obtained with the moving cursor of a variable resistor, the said cursor being capable, as a result of its movement, of simultaneously and in the inverse direction, varying the resistors inserted in series with the headlight filament and dimmed light filament power supply circuit; the movement of the forementioned moving cursors can be advantageously obtained mechanically or else from the movement of the moving arm of a three-position selector, or else from the movement of the moving armature of an electromagnetic relay in which the power supply is controlled by the movement of the moving arm of the three-position selector, or else, again, by a component that is subjected to direct or indirect heating due to the passage of current on placing the moving arm of the selector on the second position of the three-position selector.

It has been found, furthermore, that it could be particularly interesting not to allow the user the initiative of applying the transient lighting provided by the invention. In actual fact, if the driver of the vehicle applies the transient lighting too early, the intensities emitted by the vehicle lights would be less than those that could be emitted without dazzling the driver of the oncoming vehicle. If, on the contrary, the driver applies the intermediate lighting too late, the occupants of the oncoming vehicle would be dazzled despite the application of the said intermediate lighting. Therefore, it would appear desirable, according to the invention, to start application of the intermediate lighting from the indications delivered by a photo-sensitive component on board the vehicle that is subjected to the illumination produced by the oncoming vehicle.

Furthermore, when two vehicles are running in opposite directions, assuming that the transient lighting be slaved to the data from a photo-sensitive component, if for any reason whatsoever, as a result of chaotic road traffic for example, one of the vehicles does not receive the order enabling changeover to transient lighting in good time from its receiver component, whereas the other vehicle has received the said order, there will be a reduction in the illumination intensity of the second vehicle which will prevent the receiver component of the first vehicle from delivering the order to change over to transient lighting. Therefore, it can be seen that slaving to the orders of the receiver component must be delayed and that, furthermore, it is desirable that it be intermittent.

For the illumination received by a vehicle, it is therefore necessary to define, firstly, a glare-level corresponding to an illumination received which must provoke direct changeover to dimmed lighting or at least to very heavily attenuated headlights; secondly, an intervention level that corresponds to an illumination received which, when exceeded results, preferably, with a certain delay, as explained previously, in a power supply voltage drop in the headlights, this voltage drop having a predetermined value making it possible to define several successive levels of headlight power supply voltages; and, finally, a darkness level such that all lighting values received at less than this level result in the full voltage power supply of the headlights.

In other respects, it has been found particularly interesting, to make allowances for various situations on the road that can be encountered, to compare the predetermined level defined here above with a value that makes allowances not only for the illumination level received, but also for the variations in this illumination level as a function of time so that, if the illumination increases very rapidly as a function of time, it can be considered that the intervention level is exceeded, even if the value of the illumination, as such, is less than that of the intervention level. This makes it possible to make allowances, in particular, for the case of an oncoming vehicle appearing at a short distance after a curve.

Finally, it is necessary to make allowances for the fact that all vehicles are not equipped with similar headlight powers. The maximum intensity, according to standards, range between 75,000 cd and 300,000 cd. If all vehicles were equipped with a same attenuator system, the latter would emit the lowest light intensity, would first receive an order from its associated receiver component thereby provoking changeover to to transient lighting, whereas the other vehicle would remain with its headlights illuminated without ever receiving any order from its receiver component.

From the information given previously, it is clear that the intervention level and the glare level will increase in value as the lighting intensity of the corresponding vehicle decreases; conversely, the darkness level will be appreciably the same whatever the vehicle. As an example, it may be mentioned that satisfactory results have been obtained by adopting a value of 0.01 lux as a darkness level; with a vehicle having lights with a maximum intensity of 300,000 cd, the intervention level can be 0.10 lux with a glare level of 0.40 lux; for vehicle having lights with a maximum intensity of 150,000 cd, the intervention level can be 0.20 lux with a glare level of 0.40 lux; for vehicles having lights with a maximum intensity of 75,000 cd, the intervention level can be 0.40 lux with a glare level of 0.60 lux. It is possible to advantageously reduce the headlight power supply voltage by adopting six successive levels for the first type of vehicle mentioned here above, five levels for the second type and four levels for the third type.

The purpose of the present invention, therefore, is also the new industrial product consisting of a vehicle lighting installation characterized by the fact that it includes a photo-sensitive vehicle borne receiver component that is sensitive to the illumination received from the oncoming vehicle, the said component electrically controlling, firstly, beyond a predetermined glare level, the changeover to dimmed lighting or headlights strongly attenuated by a voltage drop relative to normal power supply; secondly, beyond a predetermined intervention level that is lower than the aforementioned glare level, a delayed voltage drop in the headlight power supply, with this voltage drop taking place by an appreciably instantaneous and successive voltage drop of predetermined value with each voltage drop taking place after a delay and after the intervention level is exceeded, and, finally, for any illumination received that is less than a predetermined darkness level that is less than the aforementioned intervention level with immediate changeover to headlights with full power supply voltage.

In a preferred application mode, the darkness level is fixed at a very low value, of the order of magnitude of the sensitivity of a photo-sensitive component; the intervention level and the glare level increase as the illumination power of the vehicle on which the installation is mounted decreases.

To better understand the purpose of the invention, a description will now be given, as a purely illustrative and non-limitative example, of several application modes illustrated on the attached drawing.

On this drawing :

FIG. 1 is a graph showing the illumination variation on the eye as a function of the distance of the light source from this eye, in this case, the distance between the two oncoming vehicles;

FIG. 2 is a graph illustrating the power supply voltage variation of the lights of a vehicle as a function of the distance separating the latter from another vehicle in accordance with an application mode of the invention;

FIGS. 3 to 6 are assembly layouts used to make the power supply voltage of the lights vary in accordance with the invention;

FIGS. 7 to 10 illustrate the images given by the various vehicle light beams, perfected in accordance with the invention, on a standard screen;

Figure 11:
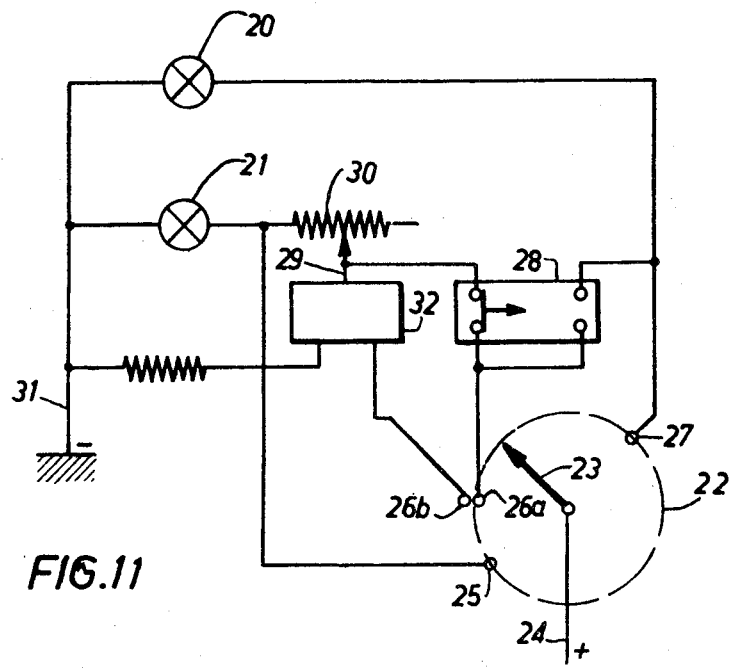
Figure 15:
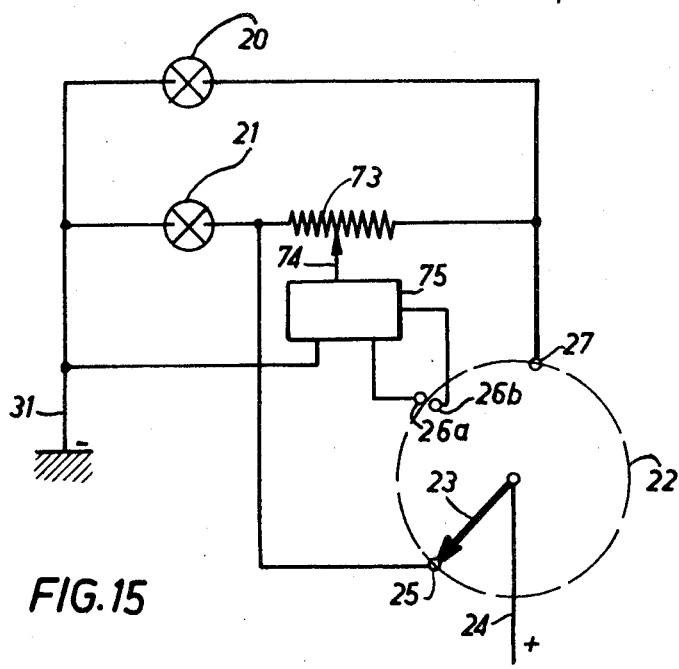
Figure 12:
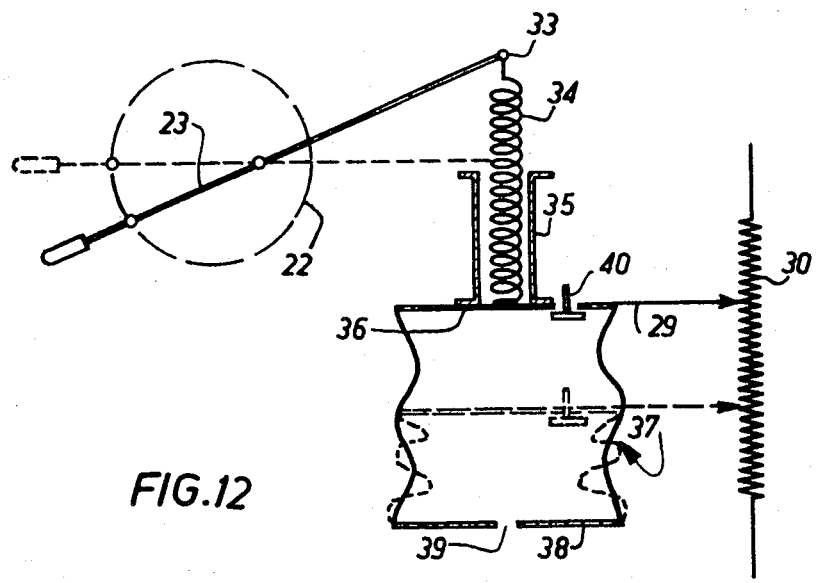
Figure 13:
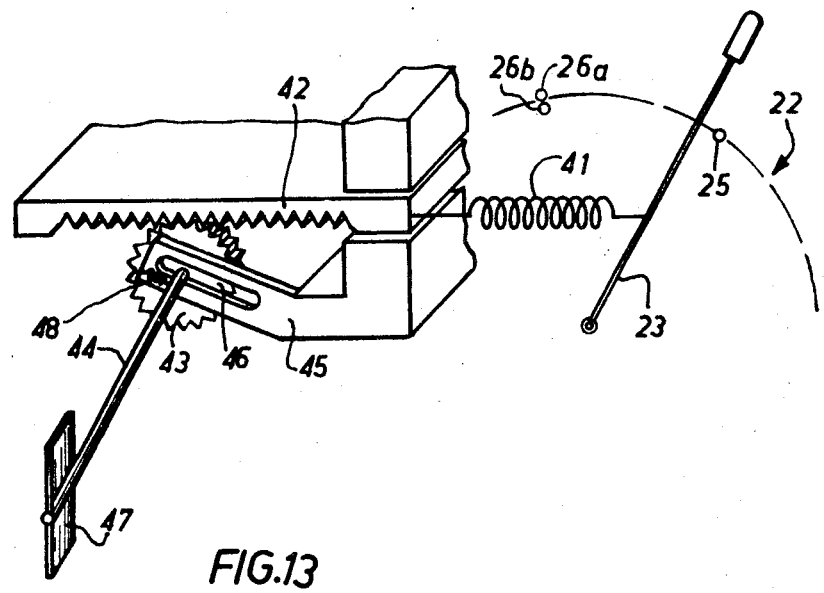
Figure 14:
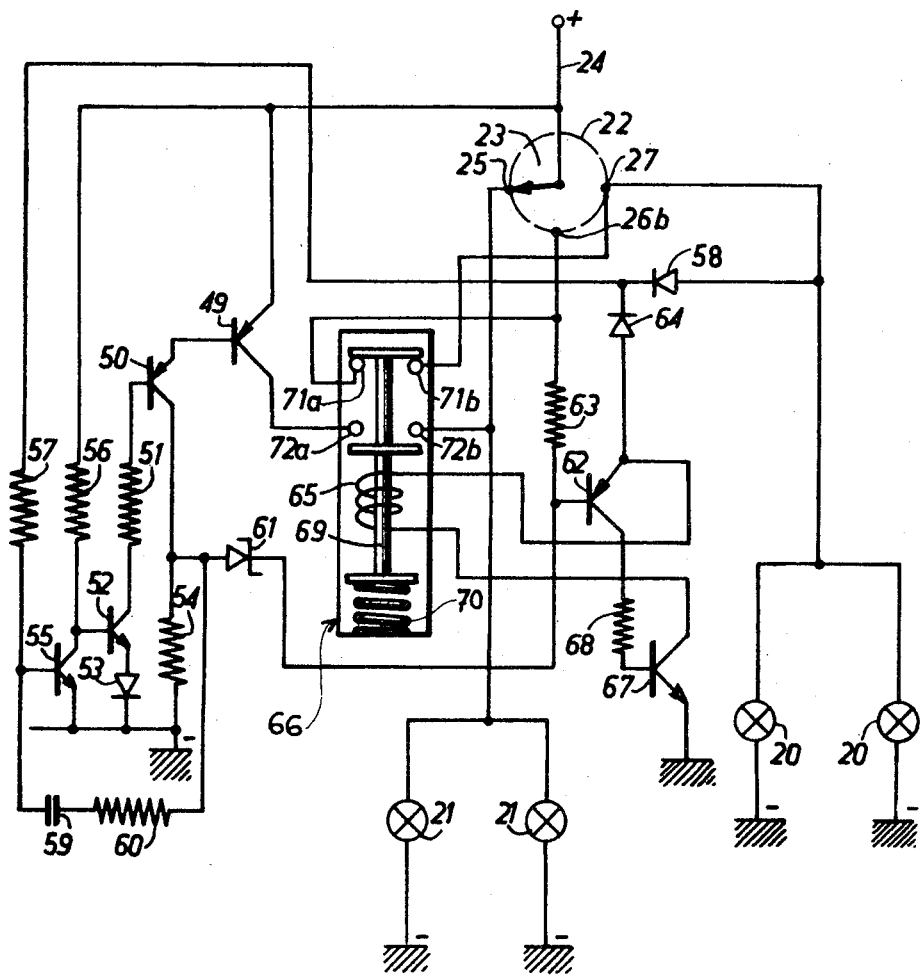
Figure 16:
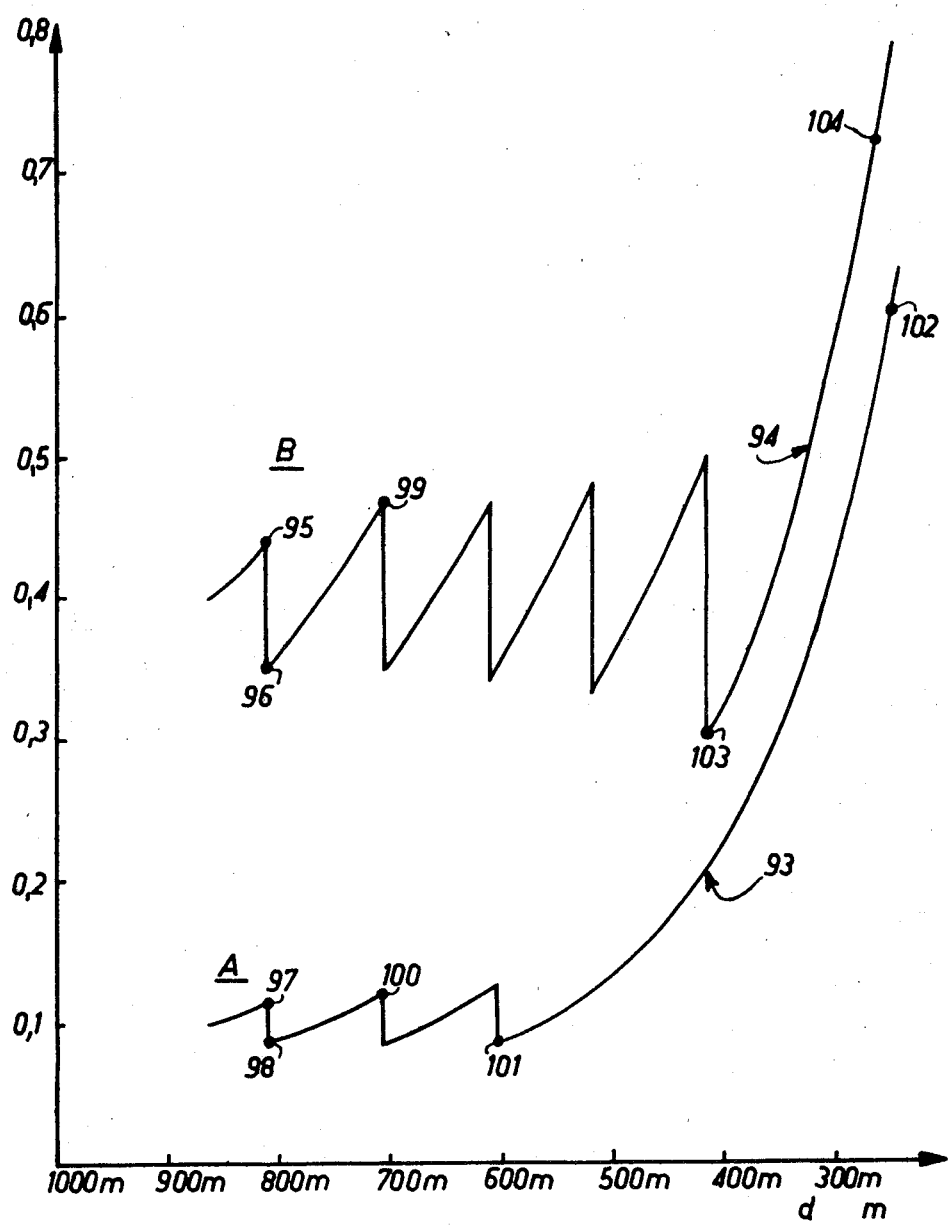
Figure 17:
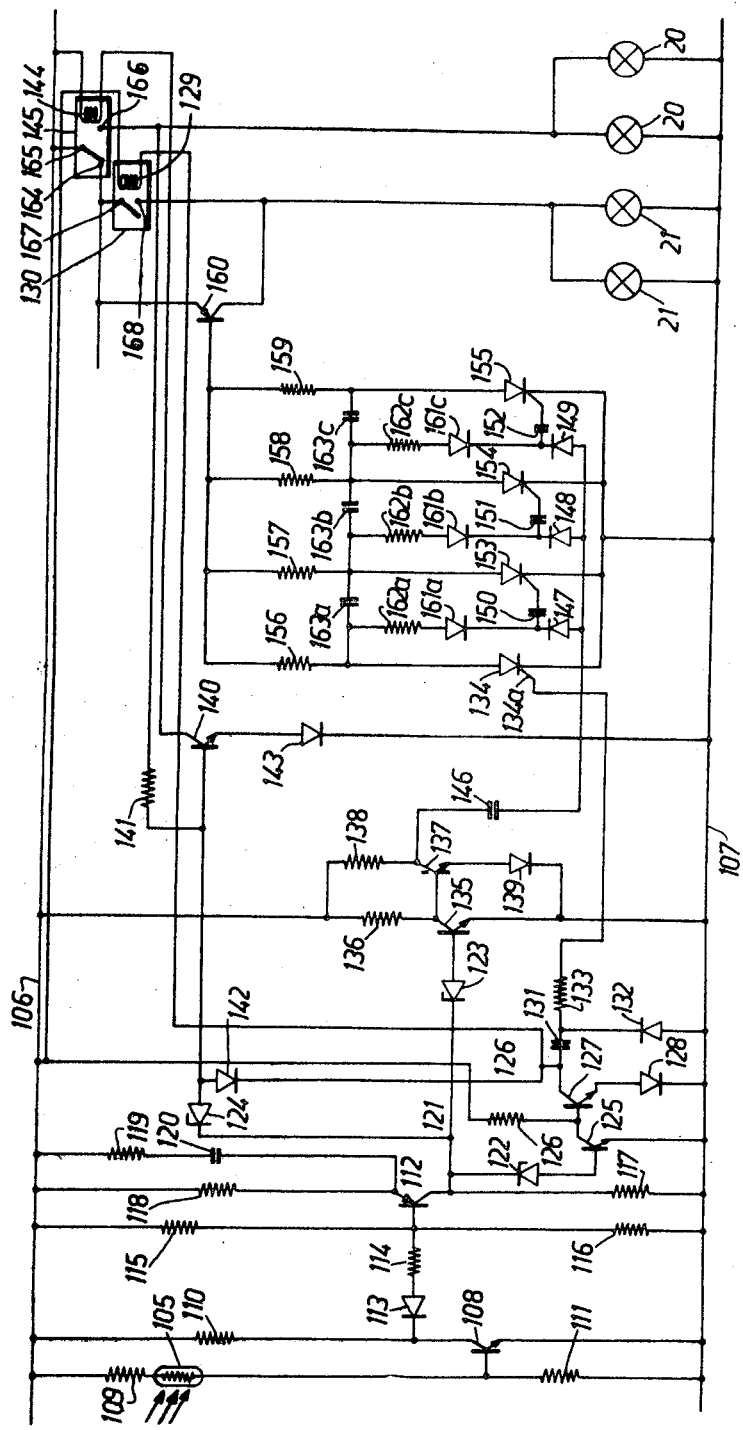

FIG. 11 gives a diagrammatic illustration of a headlight and dimmed light filament power supply circuit enabling a power supply voltage variation of the headlights by means of a variable resistor in which the cursor is mechanically controlled;

FIG. 12 gives a detailed diagrammatic illustration of a control system for the moving cursor of the variable resistor in the circuit illustrated on FIG. 11;

FIG. 13 gives a detailed illustration of a second application mode for the moving cursor control of the variable resistors in the circuit on FIG. 11;

FIG. 14 illustrates the layout of a headlight and dimmed light power supply circuit using a three-position manual selector, the progressive variation in the power supply voltage of a headlight filament being obtained electrically;

FIG. 15 gives a diagrammatic illustration of a headlight and dimmed light power supply circuit that can vary continuously and simultaneously in reverse direction on application of transient lighting with a three-position selector;

FIG. 16 represents the variation curves of illuminations received by two oncoming vehicles on which the headlight illuminations are supplied by voltages varying in an intermittent manner;

FIG. 17 illustrates the electrical power supply circuit of a lighting installation installed on one of the vehicles in which the illumination variation is illustrated on FIG. 16.

On the graph of FIG. 1, the distances in meters separating a vehicle from another oncoming vehicle are plotted on the abscissae and the illumination to which the driver's eye is subjected from one of these vehicles is plotted on the ordinates. The allowable glare limit corresponds to an illumination of 1.4 lux.

Curve 1 illustrates the variation in the illumination of the eye on the approach of a vehicle with a headlight illumination intensity of 250,000 candelas. With such an intensity, the illumination of the eye attains the 1.4 lux limit for a distance of approximately 400 meters thereby corresponding to point A on the graph. For a headlight intensity of 300,000 cd, the limit would be attained at B on curve 2, at an eye distance of approximately 460 meters.

According to the usual method applied at present, as soon as the glare limit is attained, the driver of the vehicle "dims his lights" that is to say, changes over from headlight to dimmed light, thus changing the illumination of the eye under consideration to values A' and B'. The illumination again increases, first slowly, then more rapidly, progressively as the vehicles approach each other. This is illustrated on the graph by curve 3. This illumination again attains the allowable limit at point C that corresponds to a distance of approximately 25 m. between the vehicles. It further increases slightly before the vehicles cross then cancels itself out.

It can be seen that, throughout the distance corresponding to the part of curve 3, which is close to the axis of the abscissae, the driver is not dazzled. On the other hand, the road is very badly illuminated between the vehicles which, as is well known, is a cause of danger.

The invention proposes to use transient lighting on the vehicle enabling, without dazzling the opposite driver, satisfactory visibility for the driver over the forementioned dangerous distance.

One of the means that can be applied to attain this purpose, consists in giving the transient lighting an intensity that reduces progressively as the vehicles approach each other so as to assure progressive changeover from normal headlights to dimmed lights.

Considering, for example, a vehicle that is equipped with 250,000 cd headlights, it is possible, for example, to replace the headlights by transient lighting which, initially, appreciably generates the same illumination as the headlights but with an intensity that progressively decreases, for example according to curve 4, up to a corresponding point D, for example at a distance of 50 meters between the vehicles where conventional dimmed lighting would then be applied.

To obtain this result, it is possible, either to temporarily increase the power supply voltage of the dimmed lighting system that is placed into service after having extinguished the headlight system and to progressively reducing the headlight voltage to only change over to dimmed lighting when close to the oncoming vehicle, or again, to select an intermediate solution between these two solutions.

On FIG. 2, which concerns the second solution that appears preferable, the power supply voltage of the headlight bulbs, is first the ordinary voltage of 13.2 volts delivered by so-called conventional 12-volt equipment. At approximately 400m from the oncoming vehicle, which corresponds to point A on FIG. 1, the voltage progressively starts to drop so as to attain 2.6 volts when the distance between the vehicles is no more than 50 meters, thereby corresponding to point D on FIG. 1. The headlight bulbs or filaments are then extinguished so as to place the dimmed light system into service which is normally supplied with 13.2 volts (portion D', C on FIG. 2).

More or less complex systems can be used, for example photo-electric systems, to adjust the voltage at the terminals of bulbs or filaments in accordance with the method described above.

The detailed study of relative speed conditions, when vehicles cross each other, nevertheless demonstrates that it is possible to select a slightly variable time, according to the speed, to obtain results that are acceptable in practise. Thus, for example, it is possible to accept a voltage variation, for example, of between 13.2 and 2.6 volts as mentioned above as an example, for a period of 6 to 10 seconds the voltage variation being inversely proportional to the time.

Such a variation can be obtained, as shown on FIG. 3, by inserting a positive coefficient thermistor in series with the headlight bulb or filament, the inertia of this thermistor being appropriate to the voltage variation that it is desirable to obtain.

Selector 5, which is placed in position I for the headlights then ensures the direct power supply of headlight filament R.

As soon as a risk of glare could be feared, it is changed over to transient lighting position II, that places thermistor $T_1$ in series with filament R and, consequently, progressively reduces the power supply voltage of this filament.

When the oncoming vehicle is sufficiently close, the selector is placed on position III. It then ensures the full voltage power supply of dimmed filament C, with transient lighting being cut.

In order to make allowances for sudden circumstances when change over to dimmed lighting is immediately necessary, selector 5 is manufactured in such a manner that it be possible to immediately change over from position 1 to position 3.

On the diagram of FIG. 4, a photo-resistor P is mounted in parallel with headlight bulb R. Where the remainder is considered, the layout is identical to FIG. 3. Photo-resistor P is placed on the vehicle in such a manner as to be illuminated by the oncoming vehicle. As soon as the latter is sufficiently close, it provokes a reduction in the intensity of the headlight beam thereby inciting the driver to change over to position II.

In accordance with the alternative on FIG. 5, it is possible to automatically render change over from transient attenuated headlight position to dimmed lighting position automatic while enabling direct change over from normal headlights to dimmed lighting.

A relay containing two coils $B_1$ and $B_2$ and an armature 6, normally connects terminal II of selector 5 to contact $b_1$ on which headlight filament R and thermistor $T_1$ similar to those mentioned in the preceding examples, are connected in series. Coil $B_1$ is mounted in parallel with the terminals of thermistor $T_1$. When the selector is placed in position II, the thermistor first short circuits coil $B_1$ but, since its resistance progressively increases, the voltage at the terminals of $B_1$ also increases and after a certain period, the relay operates and then links terminal II to contact $b_2$. Coil $B_2$ of the excited relay, maintains the armature on contact $b_2$. It can be mounted in series with the dimmed light filament C, as illustrated on the drawing, or again, in parallel.

It is also possible to make provision for another relay with a coil $B_3$, in series with photo-resistor P (mounted as illustrated on FIG. 4) and which actuates a contact 7 linking terminal II of the selector to the power supply of the moving arm of the latter. Under these conditions, when the selector is on position I and when an oncoming vehicle influences photoresistor P, relay $B_3$ operates and ensures direct changeover to position II.

If it is not found desirable to reduce the voltage at the terminals of the headlight filaments to such an extent as indicated on FIG. 2, it is possible to consider momentarily applying overvoltage to dimmed filament C. With direct current power supply, bulbs designed for a voltage that is less than the normal utilization voltage are used.

A positive thermistor $T_2$ is then inserted in the dimmed light filament circuit by selecting the inertia of this thermistor in such a manner that, after a desired elapsed time, the dimmed light filament is supplied with its normal voltage.

When the selector occupies position III, a resistor 8 makes it possible to supply the dimmed light filament C at its normal voltage.

A switch 9 enables headlight flashing whatever the position of switch 5.

With a vehicle supplied with direct current, it is necessary to use bulbs with a non-standard voltage rating and it can be found necessary to reduce the voltage of the intermediate lighting less rapidly to change over, slightly later, to dimmed lighting as shown, for example, on curve 10 of FIG. 1. Point F then corresponds to a distance of approximately 40 meters between the vehicles.

When the vehicle is equipped with an alternator, it is possible to use the layout on FIG. 6 in combination with that of FIG. 5.

A booster S makes it possible to supply filaments R and C with an appropriate voltage that is higher than that of normal voltage. If the voltage at the alternator terminals becomes insufficient, that is to say, when the vehicle moves at very low speed, a relay $B_4$, with the moving armature carrying reference 11, enables change over to supply from a battery 12.

It is evident that the various components, such as the thermistors and photo-resistors mentioned above can be formed from various components such as semiconductors enabling adaptation of the assemblies thus formed to the characteristics of the circuits.

It could be found desirable, in certain cases, to ensure a decrease in the intensity of the headlight beam intensity in accordance with a law that is very close to the true variation of the distance between the vehicles. It is possible to obtain this result, for example, with a computer controlled by a photo-sensitive component (not illustrated and delivering, at regular intervals, for example every second, a signal used to control an inertia system fulfilling the function of the forementioned thermistor $T_1$.

In accordance with one alternative, it is possible, on change over to intermediate lighting, to simultaneously illuminate the dimmed beams with an intensity that can be fixed or even variable.

It is also possible, during this changeover, to extinguish the headlight beam and use additional lights with characteristics that have been studied to best meet the conditions under consideration.

According to the alternatives illustrated on FIGS. 7 to 13, it is possible to break down the headlight beam into several elementary beams with separate controls.

FIG. 7 illustrates the image given by a headlight on a standard test screen for driving on the right as defined by NF Standard R 136-15 Appendix III and on which the line $H_1$, H, $H_2$ represents the horizon, with lines G and D respectively representing a perspective view of the right and left hand sides of the road, and line V V being vertical to the vanishing point (the layout would be symmetrical relative to vertical line VV in the case of vehicles driving on the left).

This images includes three zones :

Zone $Z_1$ corresponds to usual dimmed lighting.

Zone $Z_2$ corresponds to transient lighting with the purpose of ensuring good visibility on the right hand side of the road.

Zone $Z_3$ completes the beam and, in combination with Z and $Z_2$, corresponds to normal headlights.

A single selector enables lighting control.

In the headlight position, it lights the three elementary beams ensuring illumination of the three zones. This is position I that was mentioned in connection with FIGS. 3 to 6.

In the transient lighting position, the beam corresponding to zone $Z_3$ is extinguished (Position II).

In dimmed lighting position (Position III) only the beam corresponding to zone $Z_1$ remains lit.

In the alternative on FIG. 8, the transient illumination corresponding to zone $Z_2$ is delivered by a beam of conventional dimmed beam type but angularly offset around the optical axis of the reflector thereby making it possible to use a suitably oriented and ordinary dimmed bulb or filament for this purpose. The break can be made vertically or, better still, at an angle $\alpha$ of approximately 30 to 45° to vertical in the upper left hand quadrant of the screen (always in the case of traffic driving on the right).

Zone $Z_3$ is then asymmetrical and offset to the left so as to render the total beam corresponding to the three zones practically homogenous.

According to FIG. 9, a slight upward offset is provided in Zone $Z_1$, in $Z'_1$, totally or partially on the joint utilization of dimmed lighting with transient lighting where the beam $Z'_1$ is then combined with beam $Z_2$ as in the preceding example. This setting is also retained for the headlights that include the utilization of the three beams. It is suppressed when the dimmed lighting is used alone.

According to FIG. 10, Zone $Z_1$ still corresponds to conventional dimmed lighting. To ensure transient lighting, a zone $Z_2$ is superimposed on it that has a fault or a black hole 13 in its central part that corresponds to road illumination of more than 200 to 300 meters for example. The zone $Z_3$ obviates this fault.

Considering that the headlights are illuminated, on arrival of a vehicle from the opposite direction, a beam corresponding to $Z_3$ is extinguished when the vehicles are at a distance, for example, of 400 to 450 m. The driver of the vehicle is then no longer inconvenienced. Simultaneously, for example, with systems such as those described previously, the intensity of the beam covering Zone $Z_2$ is progressively reduced to finally, for example when the vehicles are at a distance of no more than 50 meters, only retain the dimmed lighting ($Z_1$).

It is possible, for example, to obtain the illumination corresponding to zones $Z_1$ and $Z_3$ with a conventional "dim-headlight" reflector in which the dimmer filament is placed very close to the focal point and the headlight filament at a distance from this focal point so as to obtain a concentrated beam with the illumination corresponding to Zz being delivered by an additional reflector of suitable layout.

On FIGS. 7 to 10, the gaps between zones have been illustrated for them to be better distinguished; in actual fact, they are negligible.

The invention can be applied for lighting all types of vehicles; it finds a particularly interesting utilization where automobile vehicles are concerned. It should be noted that one or several zones can be illuminated with polarized light and that, in particular, the combination of zones illuminated with natural light with zones illuminated with polarized light is of a nature to afford a solution to the problem of the progressive development of polarized light illumination by enabling easier adaption of all users during a long transitory period ranging up to the possible general adoption of polarized light.

By referring to FIG. 11, it may be seen that the dimmed lights have been designated by the number 20 and the headlights by 21. A three-position selector 22 carries a rotary moving arm 23 linked with a positive power supply 24, the said moving arm being capable of making contact either with terminal 25 or with terminal 26a or 26b, or with terminal 27. A two-position switch 28 enables either the electrical linking of terminals 26a and 27 or else contact making between terminal 26a and the moving cursor 29 of a variable resistor 30 one end of which is electrically connected to one of the headlight power supply terminals 21; the other light filament terminal 21 is connected to the negative power supply 31. Similarly, a dimmed light power supply terminal 20 is connected to the negative power supply 31 whereas the other terminal is electrically connected with terminal 27 of selector 22. Terminal 26b establishes the electrical control of an operating component 32 that enables the movement of a moving cursor 29 relative to resistor 30.

In its initial position, it is assumed that switch 28 makes the link 26a–29; when the arm 23 of selector 22 makes the contact with terminals 26a, 26b, the headlight 21, initially supplied without passing through resistor 30, will be subjected to a power supply voltage that progressively decreases as cursor 29 moves over resistor 30 from left to right on FIG. 1. When, during a predetermined period, the entire coil of the resistor 30 has been placed in the circuit, the moving component of switch 28 moves and connects terminals 26a and 27; the result is that the headlights are cut and the dimmed lights supplied.

In this system, it has been found that a delay system is necessary to move cursor 29 and a delay is necessary to effect the change in position of the moving component of switch 28; this timing or delay system can be obtained by applying the thermic deformation of a component by electrical heating, whether direct or indirect, with this component being metallic (heating wire) bi-metallic (bi-blade) or could consist of an environment filled with gas or liquid or metal-liquid together. The quantity of heat developed can be slaved to obtain more or less rapid system response. FIGS. 12 and 13 illustrate two practical alternatives of a delayed mechanical control enabling the movement of cursor 29 with provision for a similar system for the delayed movement of the moving component of switch 28.

On FIG. 12, it may be seen that the moving arm 23 of a three-position selector 22 is linked by its end 33 to a spring 34 guided in a tube 35. Coil spring 34 is linked at its other end with one of the bases 36 of a flexible cylindrical environment 37. Environment 37 can change shape when base 36 is brought closer to base 38 that is maintained in fixed position; a calibrated hole 39 is drilled in the base 38 whereas the base 36 carries a valve 40 enabling air admission to environment 37.

When the user operates arm 23 for the contact, initially made with terminal 25, thereby corresponding to normal headlights, to be made with terminals 26a, 26b, thereby corresponding to transient lighting, spring 34 is compressed and base 36 tends to come closer to base 38; the compression of the gas contained within environment 37 and its slow venting through calibrated hole 39 establish a delay in the movement of base 36. A mechanical link is ensured between base 36 and cursor 29 thereby making it possible to obtain the delayed variation of the headlight power supply 21. When the reverse movement of arm 23 is performed, the movement of base 36 and cursor 29 takes place immediately as a result of air admission into environment 37 through valve 40.

On FIG. 13, there is an illustration of another delay system that could be used. Arm 23 of selector 22 is linked by means of a coil spring 41 with a rack 42 that meshes with a pinion 43. Shaft 44 of pinion 43 is supported by fittings 45 carrying an oblong slot 46 with an axis that is oblique relative to the direction of movement of rack 42. The end of shaft 44 carries a blade 47 capable of moving in a fluid environment that can offer resistance to its rotation. When arm 23 moves from terminal 25 to terminals 26a, 26b, compression of spring 41 occurs so that rack 42 has a tendency to move from right to left on the figure. Pinion 43, as a result of the orientation of the oblong slots 46, has a tendency to come closer to rack 42 and, therefore, cannot escape meshing; shaft 44 is rotationally driven by the braking effect of blade 47 : thus the desired delay is obtained for the movement of rack 42. It therefore suffices to link cursor 29 to rack 42 to obtain the desired delay variation at the terminal of headlight 21. On the contrary, if the movement of arm 23 occurs in the opposite direction, pinion 43, although maintained by a spring 48, which draws it towards rack 42, has a tendency, as a result of the slope of the oblong slots 46 to move away from rack 42 thereby provoking disengagement of the meshing and rack 42 can therefore move under the traction effect of spring 41 without the breaking due to blade 47.

The delayed reduction of the headlight power supply voltage when the transient lighting system is made to intervene can be obtained not only mechanically but electrically : an illustration is given on FIG. 14 of a system making it possible to obtain this variation. On this figure, it may be seen that the positive power supply 24 of the lighting installation is linked with the rotating arm 23 of the previously described three position selector 22; as described here above, selector 22 has a terminal 25 ensuring the direct power supply of headlight 21, a terminal 27 ensuring the direct power supply of dimming light 20 and a terminal 26b corresponding to transient lighting.

Power supply 24 is linked with the emitter of a transistor 49 the base of which is linked with the emitter of a transistor 50. The base of transistor 50 is linked by means of an adjustable resistor 51 with the collector of a transistor 52 the emitter of which is linked with the negative power supply through a diode 53. The collector of transistor 50 is linked with the negative power supply of a 15 Ohm resistor 54. The emitter of transistor 49 is linked with the collector of a transistor 55 through a 3.9 kOhm resistor 56 with the emitter of a transistor 55 linked with the negative power supply. The base of transistor 55 is linked, firstly, through a 10 kOhm resistor 57 and a diode 58 with the power supply terminal of dimmed lights 20 and secondly, with a delay circuit consisting of a 170 pF capacitor 59 and a 470 Ohm resistor 60. Resistor 60 is linked with a Zener diode 61, linked with the base of a transistor 62, the said base being linked with terminal 26b by a 1 kOhm resistor 63. The emitter of transistor 62 is linked with resistor 57 by a diode 64 and to coil 65 of a relay with the general designation of 66. The other end of coil 65 is linked with the collector of a transistor 67 the base of which is linked with the collector of transistor 62 by a 4.7 kOhm resistor 68. The emitter of transistor 67 is linked with the negative power supply. Relay 66 behaves like a moving rod 69 subjected to the effect of a spring 70, rod 69 carrying two moving contacts being capable, respectively, of ensuring the link either between terminals 71a, 71b or else between terminals 72a, 72b. Terminal 72a is linked with collector 49, terminal 72b with terminal 25 of selector 22, terminal 71a with terminal 26b of selector 22, terminal 71b with terminal 27 of selector 22.

The operation of such an installation is fairly simple to define: when arm 23 makes the contact with terminal 25, headlight 21 is normally supplied. Capacitor 59 charges through circuit 24, 49, 50, 60, 59, 55, with the circuit looped on the negative power supply through the emitter of a transistor 55. Transistors 52 and 55 are conductive but not saturated. When capacitor 59 is charged, transistor 55 blocks since its base is no longer supplied; transistors 52 and 50 are saturated and transistor 49 is then ready to conduct when the arm 23 of selector 22 is brought into contact with terminal 26b.

When this contact 23-26b is made, headlight 21 is supplied through transistor 49, rod 69 of relay 66 being attracted by coil 65 in a position such that contact 72a, 72b be made. The base of transistor 55 is switched on by circuit 57, 64 and transistor 55 will have a tendency to block transistor 52 as well as transistors 50 and 49; however capacitor 59 is charged and prevents conduction in transistor 55; it thus makes it possible, by its slow discharge, not to instantaneously block transistors 52, 50 and 49. The voltage at the terminals of headlight 21 therefore decreases according to a law that is imposed by the values adapted by capacitor 59 and resistor 60. Resistor 51 makes it possible to compensate the non-linearity in the gain of transistor 50 as a function of the collector current. For a voltage at the terminals of the filaments of headlight 21 that is less than a predetermined value, Zener diode 61 and transistor 62 block thereby resulting in the blocking of transistor 67. Relay 66 de-excites and spring 70 brings rod 69 to the position where the electrical connection 71a, 71b is made. This provokes illumination of dimmed lighting 20. Simultaneously, the headlight lighting power supply 21 is cut. Finally, when the user places arm 23 of selector 22 in contact with strip 27, only the dimmed lighting 20 is supplied.

It can be seen that it is possible to obtain, with such an electrical circuit, a progressive reduction in the headlight power supply voltage as soon as the transient lighting system is applied and that automatic changeover to dimmed lighting is ensured as soon as the headlight power supply voltage drops beneath a predetermined value. The reduction time is essentially a function of the values adopted for circuit components 59, 60. With the values given previously and for 12 volt lighting, changeover to dimmed lighting takes place in approximately 4 seconds with the reduction in the headlight voltage being extended to 7 volts.

Now, by referring to FIG. 15, it can be seen that it illustrates a lighting installation in accordance with the invention in which, simultaneously and in a permanent manner, in opposite directions, the headlight and dimmed light power supply voltages of a same vehicle are made to vary. A three-position selector 22 carries a moving arm 23 linked with the positive power supply 24 of the vehicle. As previously described, selector 22 has three positions, one of which is represented by terminal 25, the other represented by the two terminals 26a, 26b, and the third represented by terminal 27. Headlight 21 is connected between the negative power supply 31 and terminal 25; the dimmed lighting 20 is connected between the negative power supply 31 and terminal 27. A resistor 73, with a moving cursor 74, electrically connected to terminal 26b has been inserted between terminal 27 and terminal 25. Cursor 74 is operated by an operating component 75 electrically controlled from terminal 26a.

When the user places arm 23 on terminal 25, he illuminates the headlight; if he places arm 23 on the terminals 26a, 26b, he lights the transient lighting. At the beginning, resistor 73 is entirely included in the power supply circuit of dimmed lighting 20 as a result of the initial position of cursor 74; with the desirable delay, operating component 75 engenders movement of cursor 74 so that the power supply voltage of headlight 21 reduces whereas that of the dimmed light 20 increases; this corresponds to a movement in cursor 74 from the left to the right on FIG. 15. When cursor 74 arrives at end of travel, the entire coil of 73 is inserted in the power supply circuit of headlights 21 thereby considerably attenuating them, whereas the dimmed lights 20 receive normal power supply.

FIGS. 16 and 17 concern a lighting installation in accordance with the invention in which the headlight power supply voltage is subjected successive drops every time the illumination of the vehicle concerned by the oncoming vehicle exceeds a predetermined intervention level. As previously explained, the intervention level concerning a vehicle with heavy intensity headlights, 300,000 cd for example, must be selected less than the intervention level corresponding to a vehicle equipped with headlights of lower maximum intensity, 75,000 cd for example. In the case illustrated on FIG. 16, it has been assumed that a vehicle with a headlight power of 75,000 cd crossed another vehicle carrying headlights with a maximum intensity of 300,000 cd, curves 93 and 94 illustrate the variation in the illuminations received by each of the two vehicles during the crossing operation while assuming that each of the two vehicles are equipped with a system in accordance with the invention. The intervention level retained for vehicle $J_1$ (300,000 cd) is 0.1 lux whereas the intervention level corresponding to the illumination received by vehicle $J_2$ (75,000 cd) is 0.40 lux. Both vehicles are equipped with 12 volt power supplies.

The illumination received by vehicle $J_1$ increases until it exceeds 0.1 lux; at this moment, the illumination of vehicle $J_2$ has exceeded 0.4 lux. Therefore, the power supply voltage of the headlights of vehicle $J_2$ is reduced to 11 volts and, given that the illumination received by vehicle $J_1$ has exceeded 0.1 lux, the power supply voltage of the headlights of vehicle $J_1$ is also reduced to 11 volts. The result for vehicle $J_2$ is a reduction in illumination received corresponding to segment 95–96; similarly, the voltage drop performed on the headlights of vehicle $J_2$ produces a reduction in the illumination received by vehicle $J_1$, the said reduction being illustrated by segment 97–98. This first effect occurs when the distance separating the vehicles is approximately 810 m.

When the vehicles approach each other, the illumination received by each vehicle again increases according to curves 96–99 for vehicle $J_2$ and 98–100 for vehicle $J_1$. The same situation again occurs and it is possible to again apply a voltage drop of a predetermined value to the power supply voltages of the headlights on each of the two vehicles thereby producing a co-relative reduction in illumination on each of the two vehicles. It is thus possible to maintain the illumination received by vehicles $J_1$ and $J_2$ at a value that is less than that of the glare level while maintaining the available illumination power at an optimum value for the driver of each of the two vehicles.

The various voltage levels applied to the headlight power supplies of each vehicle can be in variable numbers according to the type of vehicle and the maximum intensity of the lights with which it is equipped. As previously stated, it is advantageous to increase the number of levels for vehicles with a high lighting intensity. Thus, on the graph of FIG. 16, it has been assumed that, for vehicle $J_2$, the headlights were supplied by three successive voltage levels for which the effect can be ascertained on curve 93, that plots the illumination variations received by vehicle $J_1$. Similarly, it may be seen on curve 94, that plots illumination variations received by vehicle $J_2$, that five successive voltage levels have been adopted for vehicle $J_1$.

When the last voltage level is attained, that is to say the minimum voltage that is applied to the headlight power supply of each of the two vehicles, the intensity produced by the headlights of this vehicle remain constant and a minimum; consequently, the illumination received by the oncoming vehicle increases progressively as the distance reduces; this corresponds to the portion of the curve 101–102 on curve 93 and 103–104 on curve 94. At the moment when each of these curve points 102 and 104 are respectively attained, that is to say at the moment when the illumination received by the two vehicles exceeds the corresponding predetermined glare level, automatic changeover occurs to dimmed lights for each the two vehicles thereby terminating the effects of the transient lighting.

FIG. 17 illustrates the details of the power supply circuits of dimmed lights 20 and headlights 21 of vehicle $J_2$ for which curve 94 on FIG. 16 gives the illumination received. It has been seen here above that, for vehicle $J_2$, three successive voltage levels were adopted to supply the headlights. Changeover from one voltage level to another is triggered by a photo-electric cell 105 that is sensitive to the illumination received from the oncoming vehicle.

In the circuit on the FIG. 17, the positive and negative power supplies of the vehicle have been designated by 106 and 107. An NPN type transistor 108 is connected in parallel between two power supplies; its base is linked with its collector by a gallium arsenide photo-resistive cell 105, a polarization resistor 109 and, after connection with positive power supply 106, a load resistor of collector 110. The base of collector 108 is connected to the positive power supply by a base polarization resistor 111. The collector of a transistor 108 is linked with the base of a PNP transistor 112 through a diode 113 and a resistor 114. The base of transistor 112 is linked, respectively, with power supplies 106 and 107 by polarization resistors 115 and 116; the collector of transistor 112 is connected to the negative power supply by a load resistor of a collector 117; the emitter of transistor 112 is linked with the positive power supply 106 by two lines in parallel, one containing a load resistor 118 and another containing a resistor 119 and a capacitor 120.

The assembly, which has just been described, forms a direct current amplifier designed to process signals emitted by photo-electric cell 105.

The link made with the emitter of transistor 112 by resistor 118 makes it possible to make allowances for the value of the illumination recorded by cell 105; the link made with the emitter of transistor 112 through resistor 119 and capacitor 120 makes it possible to make allowances for the illumination variation as a function of time : it is thus possible to make allowances for a sharp variation in the illumination that occurs, for example, when a vehicle appears in a bend at a short distance from the vehicle equipped with the system according to the invention. The output of this amplifier stage is represented by point 121.

Point 121 is linked with three Zener diodes 122, 123, 124 that pass current if the voltage that they receive is above a certain level corresponding to the three predetermined illumination levels that have been laid down. Diode 122 corresponds to the darkness level; diode 123 corresponds to the intervention level and diode 124 corresponds to the glare level.

Zener diode 122 is linked with the base of transistor 125, the emitter of which is connected to the negative power supply 107 with its collector linked with the positive power supply 106 through a resistor 126. Between resistor 126 and the collector of transistor 125 is connected the base of transistor 127 in which the emitter is linked with the negative power supply 107 by a diode 128 with its collector linked with the positive power supply 106 by coil 129 of a relay 130. The collector of transistor 127 is linked with the negative power supply 107 through a capacitor 131 and a diode 132. A resistor 133 linked with the grid 134a of a thyristor 134 has been connected between capacitor 131 and diode 132.

Zener diode 123 is linked with the base of transistor 135, the emitter of which is connected to negative power supply 107 with its collector connected to the positive power supply 106 through a resistor 136. The collector of transistor 135 is directly linked with the base of transistor 137, with its collector connected to positive power supply 106 through a resistor 138 with its emitter connected to the negative power supply 107 by a diode 139.

Zener diode 124 is linked with a base of transistor 140 as well as, through a resistor 141, with dimmed lights 20 of the lighting installation. The output of Zener diode 124 is directly linked by diode 142 with the collector of transistor 127. The emitter of transistor 140 is linked with negative power supply 107 by a diode 143 and the collector is linked with the positive power supply through coil 144 of a relay 145.

The collector of transistor 137 is linked through a capacitor 146 with three diodes 147, 148, 149, mounted in parallel. The output of each of these three diodes respectively 150, 151, 152, drives through a capacitor, the grids of three thyristors respectively 153, 154, 155. The four thyristors 134, 153, 154, 155, are linked, firstly with the negative power supply 107 and, secondly and respectively through resistors 156, 157, 158, 159, with the base of transistor 160. A connection is made through a diode, a resistor and a capacitor between the output of each of diodes 147, 148, 149, and the output of each of the associated thyristors 153, 154, 155; these three diodes on each of these three connections have been respectively designated by 161a, 161b, 161c, the three resistors by 162a, 162b, 162c and the three capacitors by 163a, 163b, 163c. A direct connection is also made between the output of thyristors 134, 153, 154 and, respectively, capacitors 163a, 163b, 163c.

The emitter of transistor 160 is linked with the output terminal 164 of relay 145, the said relay having an input terminal 165 connected to the positive power supply 106 and a second output terminal 166 connected to the dimmed light 20 of the lighting installation. The moving armature of relay 145 can ensure the link between input terminal 165 and either of the two output terminals 164 and 166. Terminal 164 is also linked with the input terminal 167 of relay 130, the said relay only containing a single output terminal 168; the moving armature of relay 130 can make or break the electrical link between terminals 167 and 168. Terminal 168 is linked, firstly, with the collector of transistor 160 and, secondly, with headlights 21 of the lighting installation.

As previously stated, the voltages delivered by photo-electric cell 105, on reception of illumination originating from an oncoming vehicle, are amplified by transistors 108 and 112 to give a signal at connection point 121 that makes allowances, not only for the absolue value of the illumination received, but also for the illumination variation rate as a function of time. The signal obtained at connection point 121 is compared with three voltage levels corresponding to the three levels that were defined for operation of the installation in accordance with the invention, that is to say the darkness level, the intervention level and the glare level. Each of these three levels corresponds, respectively, to the operating levels of the three Zener diodes, 122, 123, 124.

If the signal at point 121 has a value that is less than that of the level of diode 122, the diode is blocked, therefore transistor 125 is also blocked. The current passes from 106 to 107 through a resistor 126, transistor 127 (base-emitter), and diode 128. Transistor 127 saturates and, therefore, allows the current to pass from 106 to 107 through coil 129, the channel (collector-emitter) and diode 128. Since coil 129 of relay 130 is supplied, the moving armature makes the contact between terminals 167 and 168 thereby enabling the power supply of headlights 21. Therefore, it can be seen that when the illumination is less than the darkness level, the headlights are switched on.

If the signal at point 121 has a value that is higher than that of the level of Zener diode 122 the said diode is conductive, so is transistor 125; transistor 127 blocks and the power supply of coil 129 is cut. The collector potential of transistor 127 increases and capacitor 131 charges thereby resulting in an increase in the potential of the grid of thyristor 134 and rendering the said thyristor conductive.

If it is assumed that the signal obtained at point 121 is less than levels 123 and 124, coil 144 is no longer supplied and contact is made between terminal 165 and 164. The current passes from 106 to 107 by passing through the channel (emitter-base) of transistor 160, resistor 156, conductive thyristor 134. Resistor 156 is selected in such a manner that the current thus obtained be sufficient to saturate transistor 160 : this results in the link being made by transistor 160 between terminal 164 and headlights 21. Relative to the direct power supply of headlights 21 from the moving armature of relay 130, a slight voltage drop occurs, approximately 0.3 to 0.7 volts thereby resulting in a very slight reduction in the illumination intensity of the vehicle lights. This circumstance arises when the darkness level has been exceeded, that is to say when an oncoming vehicle appears at a great distance with headlights on. A slight luminous intensity drop warns the oncoming vehicle of the beginning of transient lighting operation on the illuminating vehicle.

As long as the signal obtained at 121 has a value that is less than 123, the said diode 123 is blocked, transistor 135 is blocked, and transistor 137 conducts; the current, therefore, passes from 106 to 107 through resistor 136, the channel (base-emitter) of transistor 137 and diode 139. When the oncoming vehicle approaches, the illumination received increases thereby corresponding on FIG. 16, to that part of the curve located to the left of point 97 : therefore it is possible to obtain, for the signal at 121, a value that is higher than that of the level of diode 123 : at this moment, diode 123 becomes conductive, so that transistor 135 becomes conductive and transistor 137 blocks. Therefore it is found that capacitor 146 charges, with the current following route 106, 138, 146. Thyristor 134 conducts as stated previously, but thyristors 153, 154, 155 are blocked. The charge current of capacitor 146, therefore, can only loop on the negative power supply 107 through diode 147, capacitor 150 and the grid of thyristor 153. Thyristor 153, therefore, becomes conductive. Furthermore, capacitor 163a is then charged in such a manner that the potential between resistor 156 and thyristor 134 becomes very low thereby resulting in the extinguishing of thyristor 134. Therefore it may be seen that overstepping of the intervention level has extinguished thyristor 134 and has rendered thyristor 153 conductive. Resistor 157 has a value such that transistor 160 blocks part of the power supply voltage for headlights 21. Therefore, it is thus possible to obtain a first voltage level that ensures the under supply of headlights 21.

If the oncoming vehicle is equipped with a similar system, a certain voltage drop has also been applied to its headlights so that the illumination received by the vehicles in question again becomes less than the intervention level as may be ascertained from FIG. 16. The result is that Zener diode 123 no longer conducts.

When the illumination, following on the approach of two vehicles moving in opposite directions again becomes higher than the intervention level, the same phenomenon occurs again, diode 123 and transistor 135 become conductive, thyristor 154 illuminates and thyristor 153 extinguishes. The value of a resistor 158 is such that more extensive blocking of the current transmitted by transistor 160 to headlights 21 is provoked.

It may be seen that, on FIG. 17, a circuit has been illustrated that makes it possible to successively obtain three power supply voltage levels to supply headlights 21 corresponding to the moment when thyristors 153, 154, 155 successively become conductive every time that the intervention level is exceeded. It should be noted that the charge time of capacitor 146 engenders a certain delay in changing the voltage level relative to the moment of reception at point 121 of a signal that is higher than the voltage level corresponding to the intervention level; this delay is necessary to make allowances for the absence of absolute simultaneity between the illumination level changes of the two vehicles.

When a thyristor 155 is rendered conductive and the signal obtained at point 121 becomes higher than the voltage level corresponding to the glare level, diode 124 becomes conductive; a current (base-emitter) in transistor 140 is then produced, the said current passing through diode 143. Transistor 140 saturates so that the current passes through the channel (collector-emitter) and coil 144 of relay 145 is supplied thereby resulting in the electrical connection of terminals 165 and 166 : thus, extinguishing of headlights and illumination of dimmed lights at full voltage is obtained thereby corresponding to points 102 and 104 on the curves of FIG. 16.

When illumination of the dimmed lights is thus established, coil 144 remains supplied since, through resistor 141, saturation of transistor 140 is maintained.

When the signal obtained at point 121 becomes less than the signal corresponding to the darkness level, that is to say when the two vehicles have crossed, none of diodes 122, 123, 124 conduct any more; since diode 122 is blocked, transistor 125 is also blocked and the current passes from positive power supply 106 through resistor 126, the channel (base-emitter) of transistor 127, diode 128 and arrives at negative power supply 107. Transistor 127 saturates in such a manner that the current can pass through coil 129, the channel (collector-emitter) of transistor 127 and diode 128. Since coil 129 is supplied, an electrical link is made in relay 130 between terminal 167 and terminal 168 in such a manner that headlights 21 are supplied. Thus changeover to headlights is obtained as soon as crossing past another vehicle has taken place.

Therefore, it can be seen that the system, that has just been described, makes it possible to reduce the voltage of the headlights of a vehicle by levels on the approach of an oncoming vehicle, to automatically change over to dimmed lights when the oncoming vehicle is close and to automatically return to headlights on completion of the crossing.

It is well understood that the application modes described here above are in no way limitative and could give rise to any desirable modifications without, for this reason, exceeding the scope of the invention.

What is claimed is :

1. A system for automatically reducing the intensity of light emitted from head lamps of a first vehicle in response to the intensity of light from an approaching second vehicle, each of said vehicles having a power supply across which said lamps are selectively connected, comprising, on each of said vehicles: a detector for deriving a signal indicative of the illumination intensity produced by the light from the approaching vehicle, signal level detection means responsive to said intensity indicating signal, said signal level detection means including means responding respectively to three predetermined levels: A, an intervention level at which the illumination received by the first vehicle becomes disagreeable for the driver of this vehicle; B, a glare level at which the headlight (upper beam) of the first vehicle must be cut off; C, a dark level at which the use of the headlight (upper beam) of the first vehicle is acceptable for the driver of the second vehicle, means responsive to the third level for connecting the head lamps to the power supply, means responsive to the second level for connecting the dimmed light (lower beam) to the power supply, means responsive to the first level for connecting different resistance means in series with said head lamps and control means responsive to said signal detection, means for selecting the value of said different resistance means to successively reduce the intensity of said head lamps as the two vehicles are approaching each other, said control means including: means for preventing an increase in illumination emitted by the head lamps as the vehicles are approaching each other while the first level is reached even though the light intensity from the approaching vehicle drops below the intervention level and means for reducing the emitted light intensity only when the detected illumination received from the approaching vehicle exceeds a predetermined value corresponding to the intervention level.

2. The system of claim 1 which includes means for effecting a delay in change of voltage level between the supply voltage and that of the intervention level.

3. The system of claim 2 further including means for connecting the dimmed lights to the power supply in response to the power supply voltage supplied to the headlights dropping beneath a predetermined level.

4. The system of claim 3 wherein the means for connecting the dimmed lights to the power supply connects full voltage of the power supply across the dimmed lights.

* * * * *